US010704418B2

(12) United States Patent
Ramakrishnan et al.

(10) Patent No.: US 10,704,418 B2
(45) Date of Patent: Jul. 7, 2020

(54) INLET ASSEMBLY FOR AN AIRCRAFT AFT FAN

(71) Applicant: General Electric Company, Schenectady, NY (US)

(72) Inventors: Kishore Ramakrishnan, Rexford, NY (US); Shourya Prakash Otta, Danville, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/377,736

(22) Filed: Apr. 8, 2019

(65) Prior Publication Data

US 2019/0234242 A1 Aug. 1, 2019

Related U.S. Application Data

(63) Continuation-in-part of application No. 15/234,067, filed on Aug. 11, 2016, now Pat. No. 10,259,565, and
(Continued)

(51) Int. Cl.
*B64D 33/02* (2006.01)
*F01D 25/24* (2006.01)
(Continued)

(52) U.S. Cl.
CPC .............. *F01D 25/24* (2013.01); *B64C 30/00* (2013.01); *B64D 27/12* (2013.01); *B64D 29/00* (2013.01);
(Continued)

(58) Field of Classification Search
CPC ................................ B64C 21/06; B64D 29/00
See application file for complete search history.

(56) References Cited

U.S. PATENT DOCUMENTS 4,232,515 A    11/1980  Brown
4,240,250 A *  12/1980  Harris ..................... F02C 7/045
                                                            415/119
(Continued)

FOREIGN PATENT DOCUMENTS

CA        1314035 C      3/1993
CN      102336267 B      4/2014
(Continued)

OTHER PUBLICATIONS

Owens "bountary layer ingesting inlet flow control" Journel of Aircraft Aug. 2008.*
(Continued)

*Primary Examiner* — Justin M Benedik
(74) *Attorney, Agent, or Firm* — Dority & Manning, P.A.

(57) ABSTRACT

An engine for mounting in or to an aircraft includes a stage of compression airfoils rotatable about a central axis; a casing surrounding the stage of compression airfoils and defining an inlet; and a low-distortion inlet assembly mounted within the inlet. The inlet assembly includes one or more structural members mounted at predetermined locations around a circumference of the central axis within the inlet, the predetermined locations defining an airflow distortion exceeding a predetermined threshold; and at least one airflow modifying element configured within the inlet so as to reduce airflow distortion entering the stage of compression airfoils.

20 Claims, 11 Drawing Sheets

Related U.S. Application Data a continuation-in-part of application No. 15/234,055, filed on Aug. 11, 2016, now Pat. No. 10,252,790.

(51) Int. Cl.
*B64D 29/00* (2006.01)
*B64D 27/12* (2006.01)
*B64C 30/00* (2006.01)

(52) U.S. Cl.
CPC ........ *B64D 33/02* (2013.01); *B64D 2033/026* (2013.01); *B64D 2033/0226* (2013.01); *B64D 2033/0286* (2013.01); *F05D 2220/32* (2013.01); *F05D 2240/14* (2013.01)

(56) References Cited

U.S. PATENT DOCUMENTS

| | | | |
|---|---|---|---|
| 4,917,336 | A | 4/1990 | Jacobs et al. |
| 5,314,301 | A | 5/1994 | Knight |
| 6,082,966 | A | 7/2000 | Hall et al. |
| 6,292,763 | B1 | 9/2001 | Dunbar et al. |
| 6,619,916 | B1 | 9/2003 | Capozzi et al. |
| 6,709,232 | B1 | 3/2004 | Vogiatzis |
| 6,715,983 | B2 | 4/2004 | Koshoffer et al. |
| 6,820,411 | B2 | 11/2004 | Pederson et al. |
| 7,070,146 | B2 | 7/2006 | Morgenstern et al. |
| 7,114,911 | B2 | 10/2006 | Martin et al. |
| 7,195,456 | B2 | 3/2007 | Aggarwala et al. |
| 7,416,155 | B2 | 8/2008 | Cuccias et al. |
| 7,444,802 | B2 | 11/2008 | Parry |
| 7,617,670 | B2 | 11/2009 | Truax et al. |
| 7,637,455 | B2 | 12/2009 | Silkey et al. |
| 7,784,732 | B2 | 8/2010 | Owens et al. |
| 8,651,813 | B2 | 2/2014 | Long |
| 8,739,514 | B2 | 6/2014 | Conners |
| 8,840,061 | B2 | 9/2014 | Caruel et al. |
| 8,894,361 | B2 | 11/2014 | Rodriguez et al. |
| 8,973,370 | B2 | 3/2015 | Conners |
| 8,979,018 | B2 | 3/2015 | Pflug et al. |
| 9,074,483 | B2 | 7/2015 | Breeze-Stringfellow et al. |
| 9,494,053 | B2 | 11/2016 | Orosa |
| 9,884,688 | B2 | 2/2018 | Rybalko et al. |
| 9,896,219 | B2 | 2/2018 | Adamson et al. |
| 2007/0012046 | A1 | 1/2007 | Larsson et al. |
| 2009/0155072 | A1 | 6/2009 | Winter |
| 2010/0158684 | A1 | 6/2010 | Baralon |
| 2011/0164967 | A1 | 7/2011 | Elorza et al. |
| 2012/0163960 | A1 | 6/2012 | Ress, Jr. et al. |
| 2015/0086339 | A1 | 3/2015 | Orosa |
| 2016/0052621 | A1* | 2/2016 | Ireland .................... B64C 21/04 137/13 |
| 2017/0081035 | A1* | 3/2017 | Becker .................... B64C 21/06 |
| 2017/0101191 | A1* | 4/2017 | Becker .................... B64D 27/18 |
| 2017/0361939 | A1 | 12/2017 | Negulescu et al. |
| 2018/0043996 | A1 | 2/2018 | Ramakrishnan |
| 2018/0043997 | A1 | 2/2018 | Ramakrishnan et al. |
| 2018/0045205 | A1 | 2/2018 | Yao |
| 2018/0149084 | A1 | 5/2018 | Duge |

FOREIGN PATENT DOCUMENTS

| | | |
|---|---|---|
| EP | 0320620 A1 | 6/1989 |
| FR | 3052743 A1 | 12/2017 |
| SE | 528183 C2 | 9/2006 |
| WO | WO8200048 | 1/1982 |
| WO | WO2005044661 A2 | 5/2005 |

OTHER PUBLICATIONS

Owens et al., Boundary-Layer-Ingesting Inlet Flow Control, Journal of Aircraft, American Institute of Aeronautics and Astronautics, vol. 45, Issue 4, Jul.-Aug. 2008, pp. 1431-1440.

Paul et al., Experimental Studies of Active and Passive Flow Control Techniques Applied in a Twin Air-Intake, The Scientific World Journal, vol. 2013, Article ID 523759, Jun. 2013, pp. 1-9.

Samimi et al., Canard-Wing Interactions in Subsonic Flow, IJST, Transactions of Mechanical Engineering, vol. 37, No. M2, 2013, pp. 133-147.

\* cited by examiner

INLET ASSEMBLY FOR AN AIRCRAFT AFT FAN

CROSS-REFERENCE TO RELATED APPLICATIONS

This application is a continuation-in-part application of U.S. application Ser. No. 15/234,067 filed Aug. 11, 2016, and U.S. application Ser. No. 15/234,055 filed Aug. 11, 2016, and each of the above applications are hereby incorporated by reference in their entireties for all purposes.

FIELD OF THE INVENTION

The present subject matter relates generally to aircraft engines, and more particularly to an inlet assembly for an aircraft engine that reduces an airflow distortion of airflow entering a stage of compression airfoils of the engine.

BACKGROUND OF THE INVENTION

During operation of aircraft engines, an inlet of the aircraft engine can see a strong swirl distortion (or other airflow distortion) due to a variety of factors. For example in supersonic aircraft engines, the inventors of the present disclosure have found that relatively thin lips/leading edges of a nacelle located upstream of a gas turbine engine can generate airflow distortion at the inlet to the gas turbine engine at certain aircraft operating conditions. The airflow distortion can be detrimental to an operability of the engine, and particularly to the gas turbine engine. Further, such airflow distortion can cause aeromechanical and/or operational issues.

Thus, an improved inlet assembly for an aircraft engine that addresses the aforementioned issue would be welcomed in the art.

BRIEF DESCRIPTION OF THE INVENTION

Aspects and advantages of the invention will be set forth in part in the following description, or may be obvious from the description, or may be learned through practice of the invention.

In one aspect, the present disclosure is directed to an engine for mounting in or to an aircraft, the engine defining a central axis. The engine includes a stage of compression airfoils rotatable about the central axis; a casing surrounding the stage of compression airfoils and defining an inlet; and a low-distortion inlet assembly mounted within the inlet. The inlet assembly includes one or more structural members mounted at predetermined locations around a circumference of the central axis within the inlet, the predetermined locations defining an airflow distortion exceeding a predetermined threshold; and at least one airflow modifying element configured within the inlet so as to reduce airflow distortion entering the stage of compression airfoils.

In certain embodiments the engine is a supersonic turbofan engine for mounting in or to a supersonic aircraft.

For example, in certain embodiments the engine further includes a gas turbine engine including the stage of compression airfoils and a turbine coupled to the stage of compression airfoils for driving the stage of compression airfoils, and wherein the casing is a gas turbine engine casing; and an engine casing surrounding the gas turbine engine, the engine casing configured as a nacelle.

For example, in certain embodiments the gas turbine engine includes a nose cone, and wherein the inlet is defined with the nose cone.

For example, in certain embodiments the nacelle further defines a bypass passage around the gas turbine engine.

For example, in certain embodiments the inlet defined by the gas turbine engine casing is a gas turbine engine inlet, wherein the low-distortion inlet assembly is mounted within the gas turbine engine inlet.

For example, in certain embodiments the airflow duct of the nacelle defines a non-linear centerline.

For example, in certain embodiments the nacelle defines a nacelle inlet upstream of the airflow duct, wherein the engine further defines a radial direction, and wherein the nacelle inlet defines an angle with the radial direction greater than about 15 degrees.

In certain embodiments the one or more structural members include at least one of an inlet guide vane or a strut.

For example, in certain embodiments the engine further includes a plurality of inlet guide vanes placed in groups at the predetermined locations around the circumference of the central stage of compression airfoils.

For example, in certain embodiments each of the plurality of inlet guide vanes includes a shape and an orientation configured to reduce airflow distortion entering the stage of compression airfoils.

For example, in certain embodiments the inlet assembly defines a first circumferential portion having a first density of structural members and a second circumferential portion having a second density of structural members, and wherein the first density is different than the second density.

For example, in certain embodiments a leading edge radius of one or more of the inlet guide vanes varies in a span-wise direction as a function of the airflow conditions entering the stage of compression airfoils.

In certain embodiments the at least one airflow modifying element includes at least one of a vortex generator, a contoured surface, a flap, or variable inlet guide vanes.

For example, in certain embodiments the at least one vortex generator or flap is mounted on one of the plurality of structural members.

For example, in certain embodiments the contoured surface is located on an inner surface of the casing.

In certain embodiments including at least one of trailing edge blowing, trailing edge suction, or angled flow injection configured to reduce flow distortion entering the stage of compression airfoils.

In certain embodiments the predetermined locations are substantially evenly spaced with respect to the circumference of the central axis.

In certain embodiments the engine is an aft fan assembly for mounting to the aircraft at an aft end of the aircraft, wherein the stage of compression airfoils is a fan having a plurality of fan blades, and wherein the casing is a nacelle surrounding the plurality of fan blades.

In another exemplary aspect of the present disclosure, a low-distortion inlet assembly is provided for an engine of an aircraft having a stage of compression airfoils rotatable about a central axis, the engine further defining an inlet. The inlet assembly includes a plurality of structural members mounted at one or more predetermined locations around a circumference of the central axis of the engine within the inlet, the one or more predetermined locations including an airflow distortion exceeding a predetermined threshold; and at least one airflow modifying element configured within the inlet of the engine so as to reduce swirl distortion entering the stage of compression airfoils.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
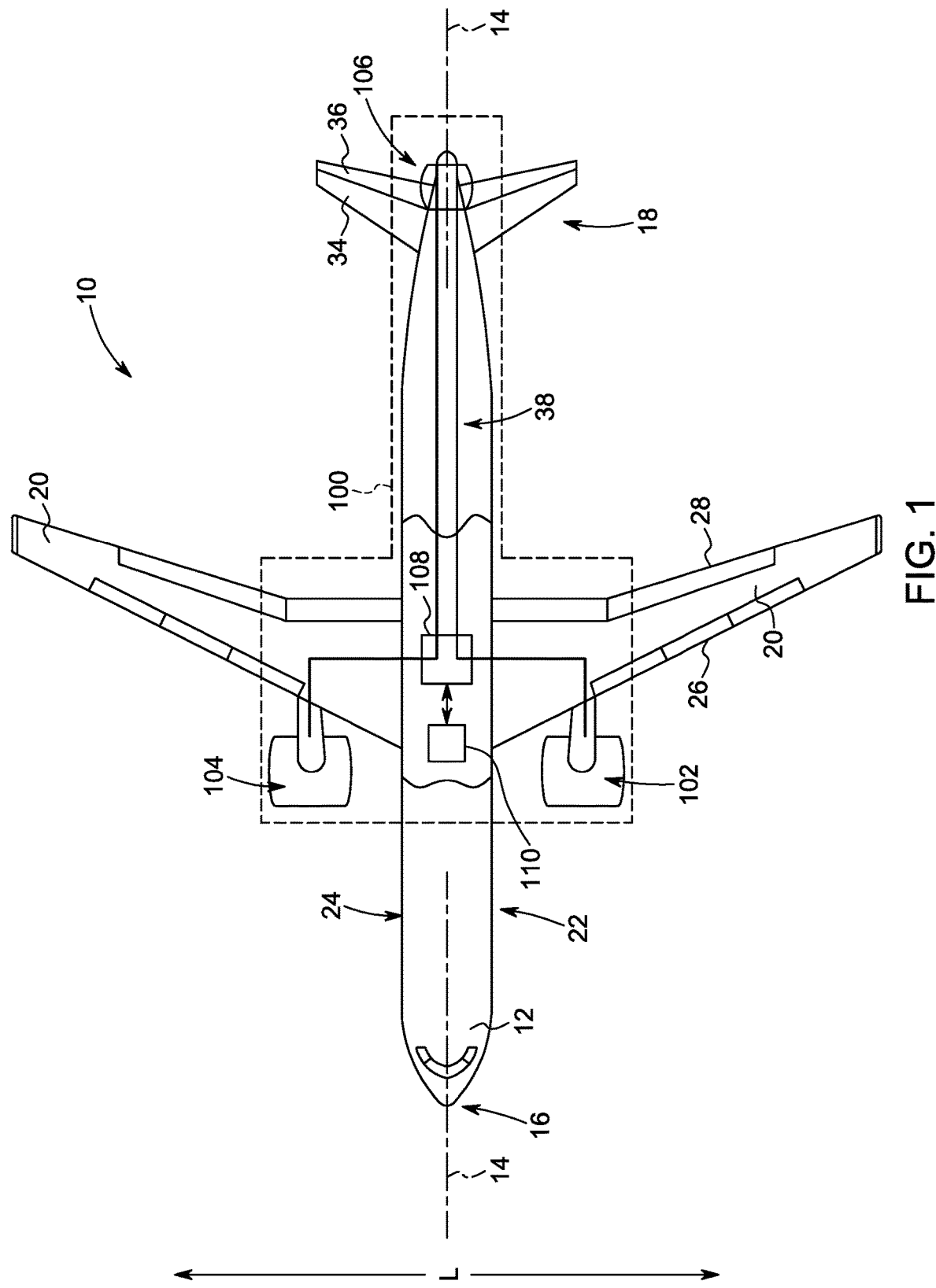
FIG. 1 illustrates a top view of one embodiment of an aircraft according to the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Generally, the present disclosure is directed to a low-distortion inlet assembly for reducing airflow swirl distortion entering an engine (or an aspect of the engine) mounted to or within an aircraft. Further, the inlet assembly includes a plurality of structural members (e.g. inlet guide vanes, struts, or similar) mounted at one or more predetermined locations around a circumference of an axis of the engine and at least one airflow modifying element configured within an inlet of the engine. More specifically, the predetermined locations have a distortion exceeding a predetermined threshold. As such, the inlet assembly is configured to reduce airflow distortion entering the engine or aspect of the engine.

The inlet guide vanes can be tailored to reduce flow distortion by introducing variations of the vanes. For example, in one embodiment, part-circumference inlet guide vanes may be located in groups at certain locations around an annulus where distortion is highest. In addition, one or more of the inlet guide vanes may be replaced with struts that provide structural support and flow turning to counter distortion. The inlet assembly of the present disclosure may also incorporate airflow modifying elements, such as vortex generators, trailing edge blowing, trailing edge suction, and/or high lift devices such as flaps attached to the structural members to further reduce distortion. Further, the inlet assembly of the present disclosure may also include non-axisymmetric internal area ruling or contouring to induce a flow field that counters the airflow distortion or moves it radially further away from the tips of the downstream compressor blades. Thus, the present invention reduces airflow distortion entering the engine or an aspect of the engine and reduces weight and helps improve the operability of the engine.

Figure 2:
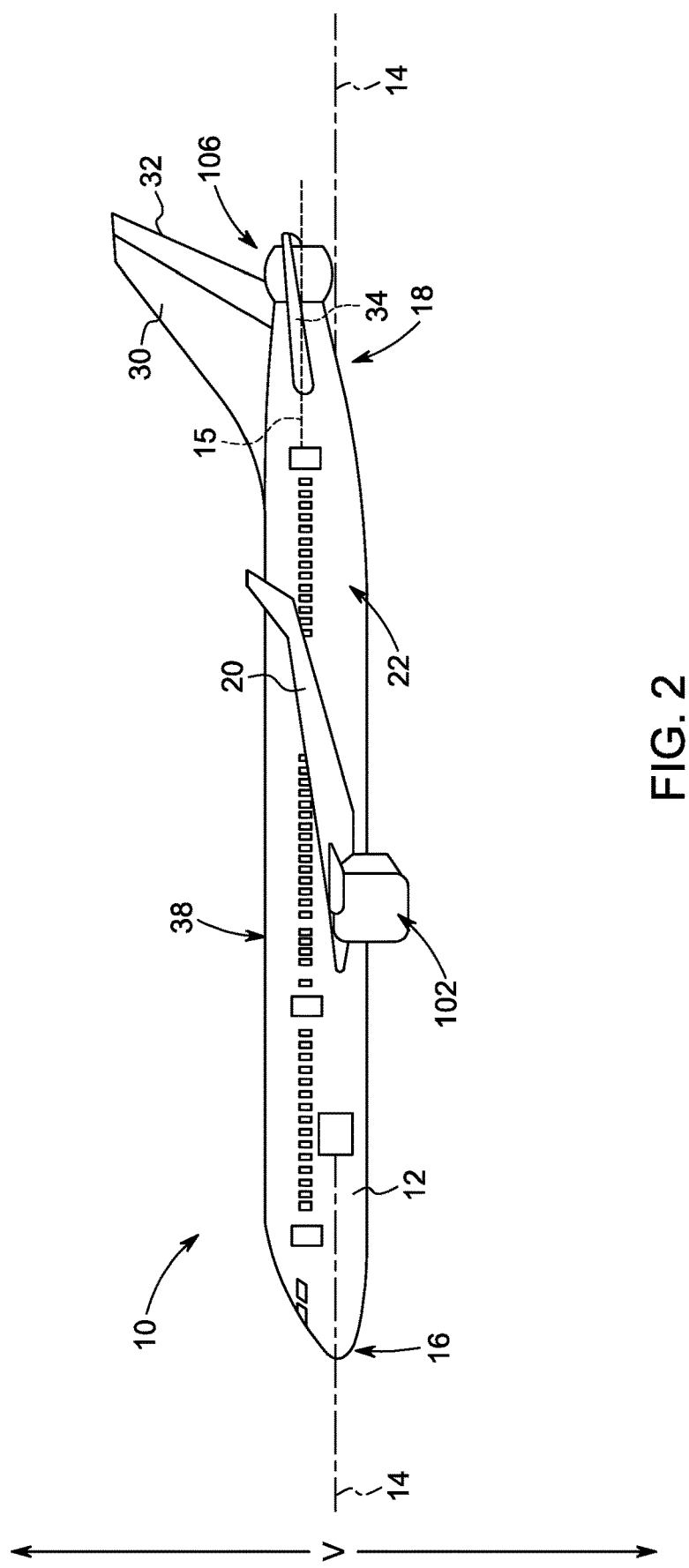
FIG. 2 illustrates a port side view of the aircraft of FIG. 1.

Referring now to the drawings, wherein identical numerals indicate the same elements throughout the figures, FIG. 1 illustrates a top view of one embodiment of the aircraft 10 according to the present disclosure. FIG. 2 illustrates a port side view of the aircraft 10 as illustrated in FIG. 1. As shown in FIGS. 1 and 2 collectively, the aircraft 10 defines a longitudinal centerline 14 that extends therethrough, a vertical direction V, a lateral direction L, a forward end 16, and an aft end 18. As will be appreciated, the aircraft depicted in FIGS. 1 and 2 may be a subsonic commercial aircraft, configured to operate at subsonic flight speeds.

Moreover, the aircraft 10 includes a fuselage 12, extending longitudinally from the forward end 16 of the aircraft 10 towards the aft end 18 of the aircraft 10, and a pair of wings 20. As used herein, the term "fuselage" generally includes all of the body of the aircraft 10, such as an empennage of the aircraft 10 and an outer surface or skin 38 of the aircraft 10. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Further, as shown in the illustrated embodiment, each of the wings 20 depicted includes one or more leading edge flaps 26 and one or more trailing edge flaps 28. The aircraft 10 may also include a vertical stabilizer 30 having a rudder flap 32 for yaw control, and a pair of horizontal stabilizers 34, each having an elevator flap 36 for pitch control. It should be appreciated however, that in other exemplary embodiments of the present disclosure, the aircraft 10 may additionally or alternatively include any other suitable configuration of stabilizer that may or may not extend directly along the vertical direction V or horizontal/lateral direction L.

In addition, the aircraft 10 of FIGS. 1 and 2 includes a propulsion system 100, herein referred to as "system 100." The system 100 includes a pair of aircraft engines, at least one of which mounted to each of the pair of wings 20, and an aft engine. For example, as shown, the aircraft engines are configured as turbofan jet engines 102, 104 suspended beneath the wings 20 in an under-wing configuration. Additionally, the aft engine is configured as an engine that ingests and consumes air forming a boundary layer over the fuselage 12 of the aircraft 10. Specifically, the aft engine is configured as a fan, i.e., a Boundary Layer Ingestion (BLI) fan 106, configured to ingest and consume air forming a boundary layer over the fuselage 12 of the aircraft 10. Further, as shown in FIG. 2, the BLI fan 106 is mounted to the aircraft 10 at a location aft of the wings 20 and/or the jet engines 102, 104, such that a central axis 15 extends therethrough. As used herein, the "central axis" refers to a midpoint line extending along a length of the BLI fan 106. Further, for the illustrated embodiment, the BLI fan 106 is fixedly connected to the fuselage 12 at the aft end 18, such that the BLI fan 106 is incorporated into or blended with a tail section at the aft end 18. However, it should be appreciated that in various other embodiments, some of which will be discussed below, the BLI fan 106 may alternatively be positioned at any suitable location of the aft end 18.

In various embodiments, the jet engines 102, 104 may be configured to provide power to an electric generator 108 and/or an energy storage device 110. For example, one or both of the jet engines 102, 104 may be configured to provide mechanical power from a rotating shaft (such as an LP shaft or HP shaft) to the electric generator 108. Additionally, the electric generator 108 may be configured to convert the mechanical power to electrical power and provide such electrical power to one or more energy storage devices 110 and/or the BLI fan 106. Accordingly, in such embodiments, the propulsion system 100 may be referred to as a gas-electric propulsion system. It should be appreciated, however, that the aircraft 10 and propulsion system 100 depicted in FIGS. 1 and 2 is provided by way of example only and that in other exemplary embodiments of the present disclosure, any other suitable aircraft 10 may be provided having a propulsion system 100 configured in any other suitable manner.

Figure 3:
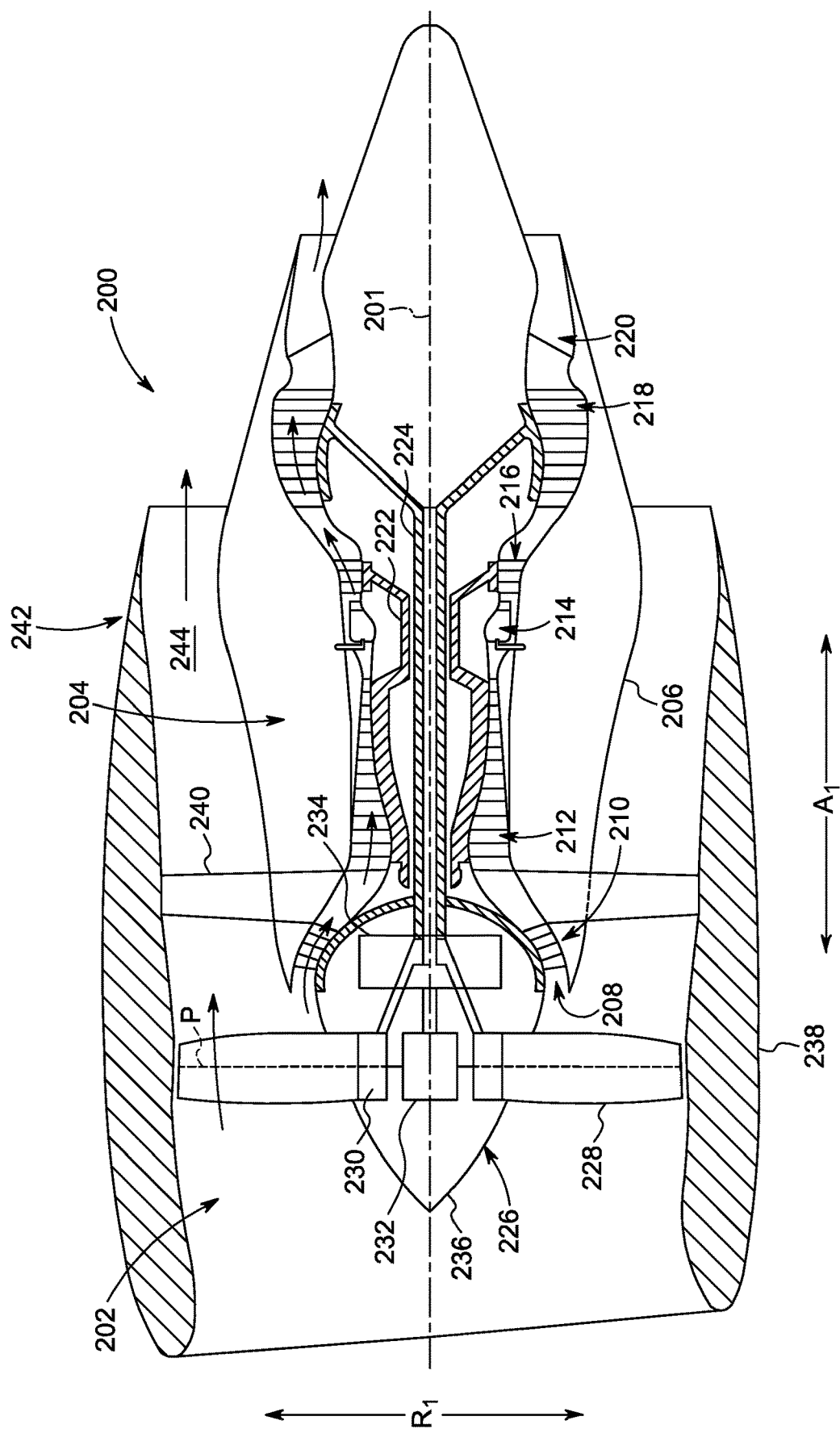
FIG. 3 illustrates a schematic, cross-sectional view of one embodiment of a gas turbine engine mounted to one of the wings of the aircraft of FIG. 1.

Referring now to FIG. 3, in certain embodiments, the jet engines 102, 104 may be configured as high-bypass turbofan jet engines. More specifically, FIG. 3 illustrates a schematic cross-sectional view of one embodiment of a high-bypass turbofan jet engine 200, herein referred to as "turbofan 200." In various embodiments, the turbofan 200 may be representative of jet engines 102, 104. Further, as shown, the turbofan 200 engine 10 defines an axial direction $A_1$ (extending parallel to a longitudinal centerline 201 provided for reference) and a radial direction $R_1$. In general, the turbofan 200 includes a fan section 202 and a core turbine engine 204 disposed downstream from the fan section 202.

In particular embodiments, the core turbine engine 204 generally includes a substantially tubular outer casing 206 that defines an annular inlet 208. It should be appreciated, that as used herein, terms of approximation, such as "approximately," "generally," "substantially," or "about," refer to being within a forty percent margin of error. The outer casing 206 encases, in serial flow relationship, a compressor section including a booster or low pressure (LP) compressor 210 and a high pressure (HP) compressor 212; a combustion section 214; a turbine section including a high pressure (HP) turbine 216 and a low pressure (LP) turbine 218; and a jet exhaust nozzle section 220. A high pressure (HP) shaft or spool 222 drivingly connects the HP turbine 216 to the HP compressor 212. A low pressure (LP) shaft or spool 224 drivingly connects the LP turbine 218 to the LP compressor 210.

Further, as shown, the fan section 202 includes a variable pitch fan 226 having a plurality of fan blades 228 coupled to a disk 230 in a spaced apart manner. As depicted, the fan blades 228 extend outwardly from the disk 230 generally along the radial direction $R_1$. Each fan blade 228 is rotatable relative to the disk 230 about a pitch axis by virtue of the fan blades 228 being operatively coupled to a suitable actuation member 232 configured to collectively vary the pitch of the fan blades 228 in unison. As such, the fan blades 228, the disk 230, and the actuation member 232 are together rotatable about the longitudinal axis 12 by LP shaft 224 across a power gearbox 234. In certain embodiments, the power gearbox 234 includes a plurality of gears for stepping down the rotational speed of the LP shaft 224 to a more efficient rotational fan speed.

Referring still to FIG. 3, the disk 230 is covered by rotatable front hub 236 aerodynamically contoured to promote an airflow through the plurality of fan blades 228. Additionally, the fan section 202 includes an annular fan casing or outer nacelle 238 that circumferentially surrounds the fan 226 and/or at least a portion of the core turbine engine 204. It should be appreciated that the outer nacelle 238 may be configured to be supported relative to the core turbine engine 204 by a plurality of circumferentially-spaced outlet guide vanes 240. Moreover, a downstream section 242 of the nacelle 238 may extend over an outer portion of the core turbine engine 204 so as to define a bypass airflow passage 244 therebetween.

In addition, it should be appreciated that the turbofan engine 200 depicted in FIG. 3 is by way of example only, and that in other exemplary embodiments, the turbofan engine 200 may have any other suitable configuration. Further, it should be appreciated, that in other exemplary embodiments, the jet engines 102, 104 may instead be configured as any other suitable aeronautical engine.

Figure 4:
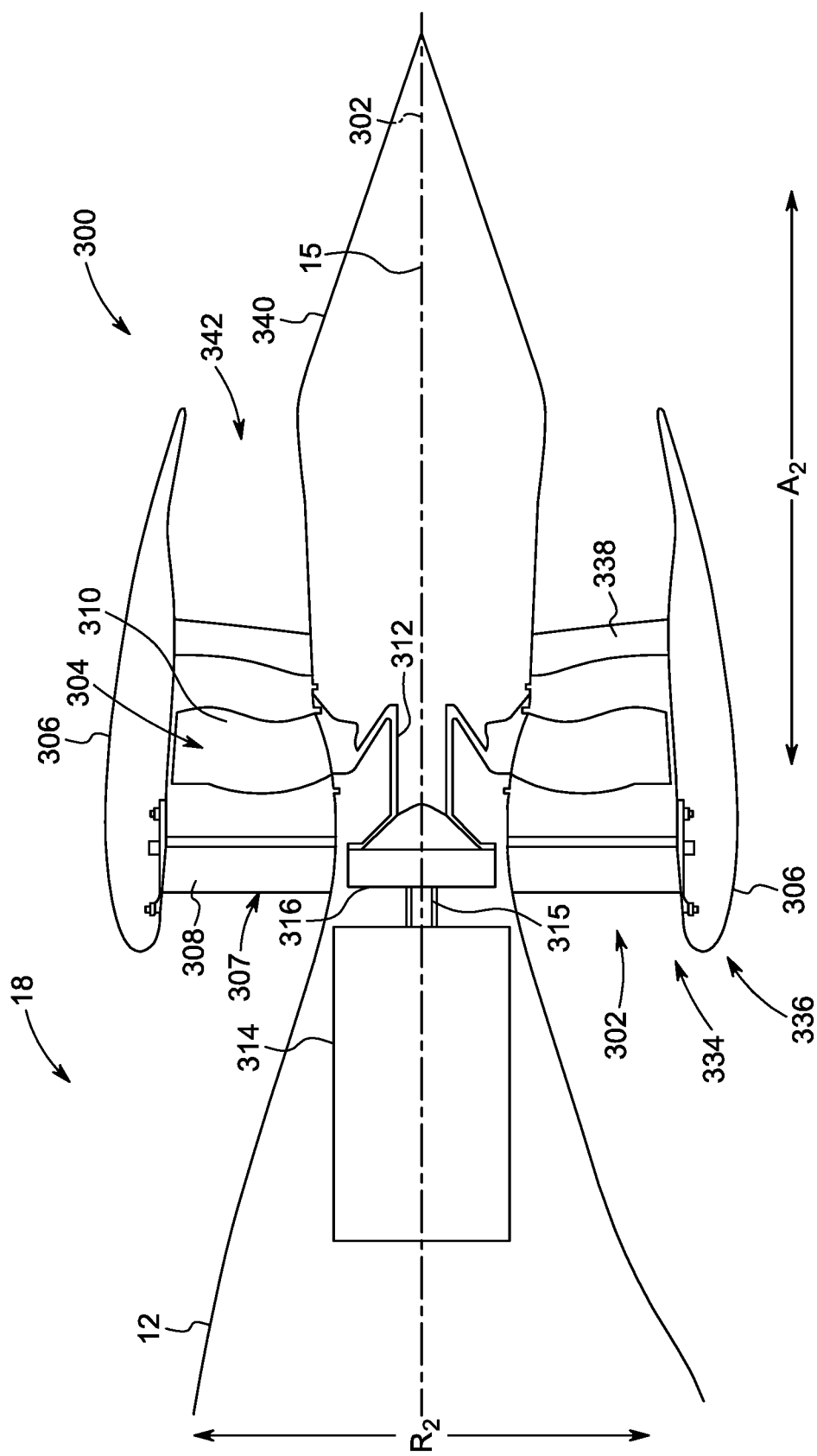
FIG. 4 illustrates a schematic, cross-sectional view of one embodiment of an aft engine according to the present disclosure.

Referring now to FIG. 4, a schematic, cross-sectional side view of an aft engine in accordance with various embodiments of the present disclosure is provided, such as the aft engine mounted to the aircraft 10 at the tail section 18 of the aircraft 10. More specifically, as shown, the aft engine is configured as a boundary layer ingestion (BLI) fan 300. The BLI fan 300 may be configured in substantially the same manner as the BLI fan 106 described above with reference to FIGS. 1 and 2 and the aircraft 10 may be configured in substantially the same manner as the exemplary aircraft 10 described above with reference to FIGS. 1 and 2.

More specifically, as shown, the BLI fan 300 defines an axial direction $A_2$ extending along the central axis 15 that extends therethrough for reference. Additionally, the BLI fan 300 defines a radial direction $R_2$ and a circumferential direction (not shown). In general, the BLI fan 300 includes a fan 304 rotatable about the central axis 15, a nacelle 306 extending around at least a portion of the fan 304, and one or more structural members 307 extending between the nacelle 306 and the fuselage 12 of the aircraft 10. Further, the fan 304 includes a plurality of fan blades 310 spaced generally along the circumferential direction $C_2$. Moreover, the structural member(s) 307 extend between the nacelle 306 and the fuselage 12 of the aircraft 10 at a location forward of the plurality of fan blades 310. Additionally, the nacelle 306 extends around and encircles the plurality of fan blades 310, and also extends around the fuselage 12 of the aircraft 10 at an aft end 18 of the aircraft 10 when, as shown in FIG. 4, the BLI fan 300 is mounted to the aircraft 10. Notably, as used herein, the term "nacelle" includes the nacelle as well as any structural fan casing.

As is also depicted in FIG. 4, the fan 304 additionally includes a fan shaft 312 with the plurality of fan blades 310 attached thereto. Although not depicted, the fan shaft 312 may be rotatably supported by one or more bearings located forward of the plurality of fan blades 310 and, optionally, one or more bearings located aft of the plurality of fan blades 310. Such bearings may be any suitable combination of roller bearings, ball bearings, thrust bearings, etc.

In certain embodiments, the plurality of fan blades 310 may be attached in a fixed manner to the fan shaft 312, or alternatively, the plurality of fan blades 310 may be rotatably attached to the fan shaft 312. For example, the plurality of fan blades 310 may be attached to the fan shaft 312 such that a pitch of each of the plurality of fan blades 310 may be changed, e.g., in unison, by a pitch change mechanism (not shown). Changing the pitch of the plurality of fan blades 310 may increase an efficiency of the BLI fan 300 and/or may allow the BLI fan 300 to achieve a desired thrust profile. With such an exemplary embodiment, the BLI fan 300 may be referred to as a variable pitch BLI fan.

The fan shaft 312 is mechanically coupled to a power source 314 located at least partially within the fuselage 12 of the aircraft 10, forward of the plurality of fan blades 310. Further, as shown, the fan shaft 312 is mechanically coupled to the power source 314 through a gearbox 316. The gearbox 316 may be configured to modify a rotational speed of the power source 314, or rather of a shaft 315 of the power source 314, such that the fan 304 of the BLI fan 300 rotates at a desired rotational speed. The gearbox 316 may be a fixed ratio gearbox, or alternatively, the gearbox 316 may define a variable gear ratio. With such an embodiment, the gearbox 316 may be operably connected to, e.g., a controller of the aircraft 10 for changing its ratio in response to one or more flight conditions.

In certain embodiments, the BLI fan 300 may be configured with a gas-electric propulsion system, such as the gas-electric propulsion system 100 described above with reference to FIG. 1. In such an embodiment, the power source 314 may be an electric motor that receives power from one or both of an energy storage device or an electric generator—such as the energy storage device 110 or electric generator 108 of FIGS. 1 and 2, the electric generator 108 converting mechanical power received from one or more under-wing mounted aircraft engines to electric power. However, in other embodiments, the power source 314 may instead be any other suitable power source. For example, the power source 314 may alternatively be configured as a gas engine, such as a gas turbine engine or internal combustion engine. Moreover, in certain exemplary embodiments, the power source 314 may be positioned at any other suitable location within, e.g., the fuselage 12 of the aircraft 10 or the BLI fan 300. For example, in certain embodiments, the power source 314 may be configured as a gas turbine engine positioned at least partially within the BLI fan 300.

Figure 5:
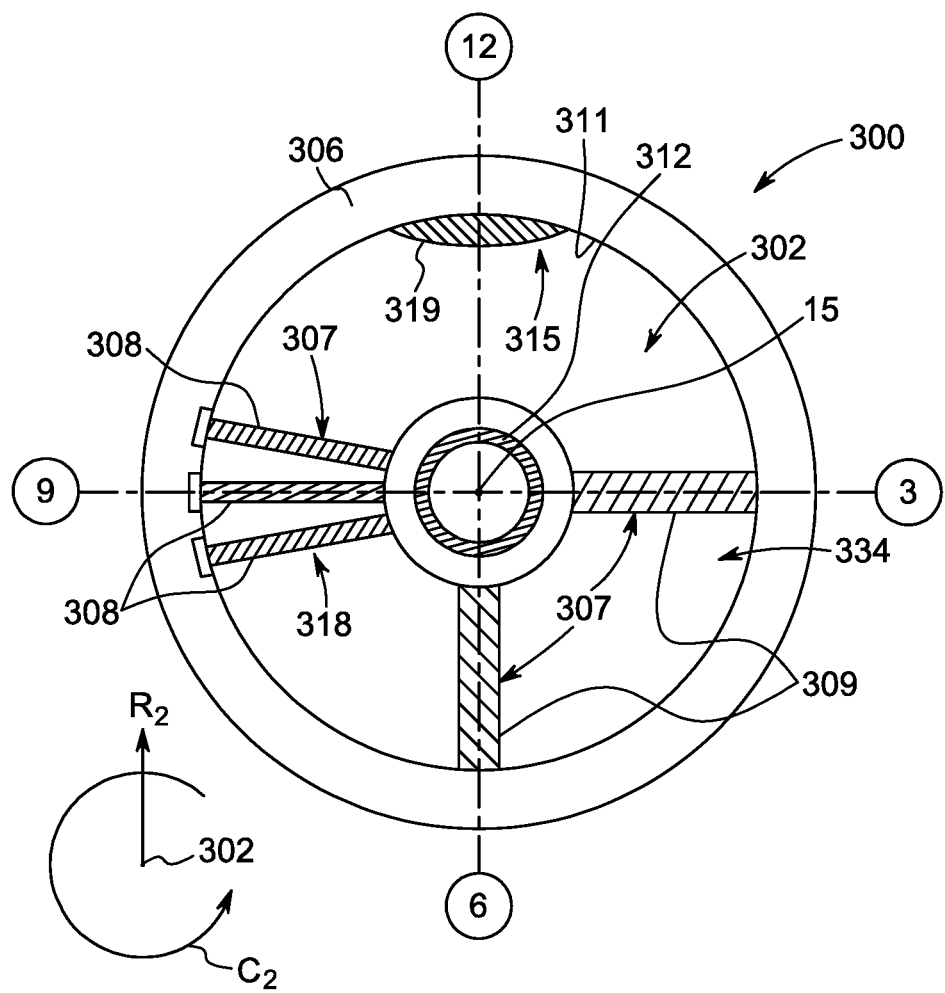
FIG. 5 illustrates a schematic, cross-sectional view of the aft engine of FIG. 4, viewed along an axial centerline of the aft engine of FIG. 4 so as to illustrate one embodiment of an inlet assembly according to the present disclosure.

As briefly stated above, the BLI fan 300 includes one or more structural members 307 for mounting the BLI fan 300 to the aircraft 10. More specifically, as shown in FIG. 5, the structural member(s) 307 may be configured as inlet guide vanes 308 for the fan 304 and/or as struts 309. Further, it should be understood that the structural member(s) 307 may be configured as fixed inlet guide vanes extending between the nacelle 306 and the fuselage 12 of the aircraft 10. Alternatively, the structural member(s) 307 may be configured as variable inlet guide vanes. Further, as shown, the structural member(s) 307 generally extend substantially along the radial direction $R_2$ of the BLI fan 300 between the nacelle 306 and the fuselage 12 of the aircraft 10 for mounting the BLI fan 300 to the fuselage 12 of the aircraft 10. As such, the structural member(s) 307 may be shaped and/or oriented to direct and/or condition a flow of air into the BLI fan 300 to, e.g., increase an efficiency of the BLI fan 300, or reduce a distortion of the air flowing into the BLI fan 300, which will be discussed in more detail below.

Referring still to FIG. 4, the BLI fan 300 additionally includes one or more outlet guide vanes 338 and a tail cone 340. The one or more outlet guide vanes 338 for the embodiment depicted extend between the nacelle 306 and the tail cone 340 for directing a flow of air through the BLI fan 300, and optionally for adding strength and rigidity to the BLI fan 300. The outlet guide vanes 338 may be evenly spaced along the circumferential direction $C_2$ or may have any other suitable spacing. Additionally, the outlet guide vanes 338 may be fixed outlet guide vanes, or alternatively may be variable outlet guide vanes. Inclusion of the plurality of outlet guide vanes 338 extending between the nacelle 306 and the tail cone 340 allows for maximizing the efficiency of the BLI fan 300.

Further, aft of the plurality of fan blades 310, and for the embodiment depicted, aft of the one or more outlet guide vanes 338, the BLI fan 300 additionally defines a nozzle 342 between the nacelle 306 and the tail cone 340. As such, the nozzle 342 may be configured to generate an amount of thrust from the air flowing therethrough. In addition, the tail cone 340 may be shaped to minimize an amount of drag on the BLI fan 300. However, in other embodiments, the tail cone 340 may have any other shape and may, e.g., end forward of an aft end of the nacelle 306 such that the tail cone 340 is enclosed by the nacelle 306 at an aft end. Additionally, in other embodiments, the BLI fan 300 may not be configured to generate any measureable amount of thrust, and instead may be configured to ingest air from a boundary layer of air of the fuselage 12 of the aircraft 10 and add energy/speed up such air to reduce an overall drag on the aircraft 10 (and thus increase a net thrust of the aircraft 10).

Referring particularly to FIGS. 4 and 5, the BLI fan 300 defines an inlet 334 at a forward end 336 between the nacelle 306 and the fuselage 12 of the aircraft 10. As mentioned above, the nacelle 306 of the BLI fan 300 extends around the central axis 15 of the aircraft 10 and the fuselage 12 of the aircraft 10 at the aft end of the aircraft 10. Accordingly, as shown, the inlet 334 of the BLI fan 300 extends substantially three hundred sixty degrees (360°) around the central axis 15 of the aircraft 10 and the fuselage 12 of the aircraft 10 when, such as in the embodiment depicted, the BLI fan 300 is mounted to the aircraft 10. Additionally, in still further embodiments, the BLI fan 300, or rather the external surface of the nacelle 306, may have any other suitable cross-sectional shape along the axial direction $A_2$ (as opposed to the circular shape depicted) and the structural members 307 may not be evenly spaced along the circumferential direction $C_2$.

Referring particularly to FIG. 5, a schematic, cross-sectional view of one embodiment of the BLI fan 300, viewed along an axial centerline 15 thereof so as to illustrate an inlet assembly 302 according to the present disclosure is illustrated. More specifically, as shown, the illustrated BLI fan 300 includes a plurality of structural members 307 mounted at one or more predetermined locations around a circumference of the fan shaft 312 of the BLI fan 300. For example, in certain embodiments, the predetermined locations as described herein have a distortion exceeding a predetermined threshold. In other words, for certain embodiments, the airflow entering the BLI fan 300 may be evaluated to determine a pattern thereof. Thus, the location and/or number of structural members 307, as well as the shape of the structural members 307, may be designed and chosen as a function of the pattern or distortion. In further embodiments, as shown in FIG. 5, only a portion of the circumference of the fan shaft 312 may include structural members 307. For example, in the embodiment shown, about fifty percent (50%) of the circumference includes structural member 307. Alternatively, the structural members 307 may be spaced around the entire circumference of the fan shaft 312. As such, in particular embodiments, the structural members 307 may be evenly spaced along the circumferential direction $C_2$ of the BLI fan 300 around the fan shaft 312. In alternative embodiments, the structural members may form one or more inlet guide vane groups 318, which may be spaced appropriately depending on the distortion pattern along the circumferential direction $C_2$ of the BLI fan 300 around the fan shaft 312.

In addition, as shown in the illustrated embodiment, the structural members 307 may be located circumferentially at a substantially twelve o'clock, a substantially three o'clock, a substantially six o'clock, and/or a substantially nine o'clock, receptively, with respect to the circumference of the fan shaft 312. It should be understood that the predetermined locations may be at the illustrated locations as well as any location therebetween and are meant to encompass locations having a high distortion and/or a location where a modification of the airflow would have the highest impact of correcting the distortion. Further, as mentioned, the structural members 307 may include inlet guide vanes 308, struts 309, or similar or any combinations thereof.

Still referring to FIG. 5, the inlet assembly 302 may also include at least one airflow modifying element 315 configured within the inlet 334. As such, the inlet assembly 302 of the present disclosure is configured to reduce distortion of the airflow entering the fan 30. Accordingly, the present disclosure may include any suitable combination of structural members 307 and/or airflow modifying elements 315 so as to offset or modify the distortion of the airflow entering the BLI fan 300, examples of which are described in more detail below.

For example, as shown in FIG. 5, the inlet assembly 302 may include a plurality of inlet guide vanes 308 placed in groups 318 at the predetermined locations around the circumference of the fan shaft 312 (i.e. spaced along the circumferential direction $C_2$ of the BLI fan 300), each extending between the nacelle 306 and the fuselage 12 of the aircraft 10 generally along the radial direction $R_2$. For example, as shown, the inlet assembly 302 includes a single group 318 of three inlet guide vanes 308. In alternative embodiments, the inlet assembly 302 may include more than one group 318 of inlet guide vanes 308 at any circumferential location having any suitable number of inlet guide vanes 308. In addition, for embodiments having more than one inlet guide vane group 318, each group 318 may include the same number of inlet guide vanes 308 or a different number of inlet guide vanes 308. In further embodiments, the inlet assembly 302 may include a plurality of inlet guide vanes 308 grouped into a plurality of separate and distinct inlet guide vane groups 318 around the circumference of the fan shaft 312.

In addition, the inlet assembly 302 may include one or more struts 309 extending between the nacelle 306 and the fuselage 12 of the aircraft 10 generally along the radial direction $R_2$. Generally, struts are structural components designed to resist longitudinal compression. In addition, the struts 309 of the present disclosure are strategically placed at the predetermined locations so as to redistribute the airflow entering the fan 300 more uniformly circumferentially so as to reduce swirl distortion at the inlet 334. For example, as shown, the illustrated inlet assembly 302 includes at least two struts 309, i.e. at the three o'clock and the six o'clock positions, respectively. In further embodiments, the inlet assembly 302 may include more than two or less than two struts 309.

Figure 6:
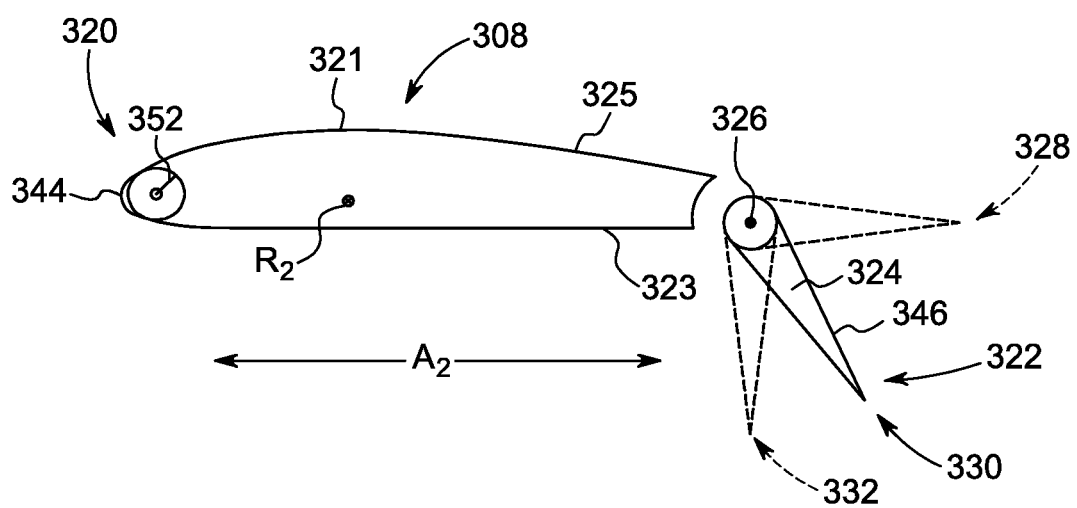
FIG. 6 illustrates a cross-sectional view of one embodiment of an inlet guide vane of an inlet guide vane assembly according to the present disclosure, particularly illustrating an inlet guide vane having a rotatable flap at a trailing edge thereof.
Figure 7:
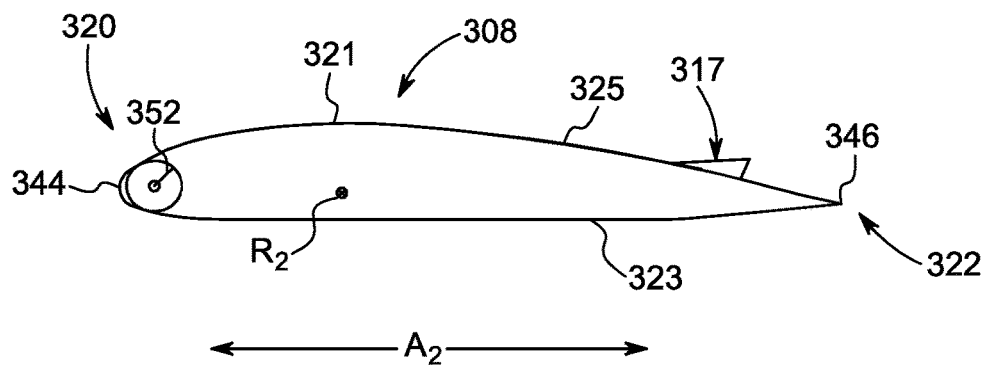
FIG. 7 illustrates a cross-sectional view of another embodiment of an inlet guide vane of an inlet guide vane assembly according to the present disclosure, particularly illustrating an inlet guide vane having a vortex generator configured thereon.

Referring particularly to FIGS. 5-7, the airflow modifying element(s) 315 may include at least one of a vortex generator 317 (FIG. 7), a contoured surface 319 (FIG. 5), a flap 324 (FIG. 6), or any other airflow modifying element. More specifically, as shown in FIG. 5, the inlet assembly 302 may include a contoured surface 319 or area ruling on an inner surface 311 of the nacelle 306, e.g. at the twelve o'clock position, that is configured to push airflow radially inward and away from the contoured surface 319. As such, the contouring of the inner surface 311 of the nacelle 306 is configured to induce a flow field that counters a type of swirl distortion of the airflow entering the inlet 334. In addition, the inner surface 311 of the nacelle 306 may also include one or more indentions configured to modify the airflow.

Further, as shown in FIG. 7, one or more of the structural members 307 may include a vortex generator 317 and/or a flap 324 configured therewith. More specifically, FIGS. 5 and 6 illustrate cross-sectional views of an inlet guide vane 308 taken along the radial direction $R_2$ that may be included in the inlet assembly 302. As shown, the inlet guide vane 308 extends between a forward, upstream end 320 and an aft, downstream end 322. The forward, upstream end 320 includes a leading edge 344 of the inlet guide vane 308 and the aft, downstream end 322 includes a trailing edge 346 of the inlet guide vane 308. A body 325 of the inlet guide vane 308 is fixed relative to the nacelle 306 of the BLI fan 300 and the fuselage 12 of the aircraft 10 and includes a pressure side 323 and a suction side 321. Further, as shown, the inlet guide vane 308 may include one or more vortex generators 317 configured on one or more of the pressure or suction sides 323, 321. For example, as shown, the illustrated inlet guide vane 308 includes a single vortex generator 317 on the suction side 321 thereof. In additional embodiments, the inlet guide vanes 308 and/or the struts 309 may include any number and/or type of vortex generators or similar surface features mounted to a surface thereof so as to redirect the airflow entering the BLI fan 300.

In addition, as shown in FIG. 6, the inlet guide vanes 308 may also include an optional flap 324 at the aft end 320 configured to rotate about a substantially radial axis 326. For example, as shown, the flap 324 is configured to rotate between a first position 328 (in phantom), a neutral position 330, a second position 332 (in phantom), and a potentially infinite number of positions therebetween. By rotating the flap 324 between the various positions, the inlet guide vanes 308 may be configured to vary a direction in which air flowing thereover is directed.

In yet another embodiment, the inlet assembly 302 may include trailing edge blowing or suction that is configured to reduce axial or swirl distortion entering the BLI fan 300. In addition, the inlet assembly 302 may include angled flow injection. Generally, trailing edge blowing encompasses flow injection along the direction of the airflow. In contrast, angled flow injection encompasses flow injection at an angle. Further, the flow injection may be steady or unsteady. As used herein, trailing edge blowing generally refers to a technique of injecting air into the inlet 334 at or near the trailing edge 346 of the inlet guide vanes 308 or slightly upstream of the trailing edge 346. For example, in one embodiment, trailing edge blowing may include injecting airflow into the main airstream through a hole or slot configured within the airfoil. As used herein, trailing edge suction generally refers to a technique draining air from the inlet 334 at or near the trailing edge 346 of the inlet guide vanes 308 or slightly upstream of the trailing edge 346. As such, both trailing edge blowing or trailing edge suction are configured to modify the airflow entering the inlet 334 so as to reduce airflow distortion entering the fan 300. Further, trailing edge blowing can be achieved by steady or pulsed blowing aligned with the airflow or at an angle to achieve the same effect as a miniature vortex generator or tab. Notably, as used herein, the term "airflow distortion" refers to variation in airflow properties, such airflow properties including airflow speed, airflow pressure, etc. Accordingly, airflow distortion entering the fan 300 refers to variations in these airflow properties over an entire face of the fan (circumferentially and radially), at a location downstream of the inlet and upstream of the fan, such as at a location immediately upstream of the fan.

Figure 8:
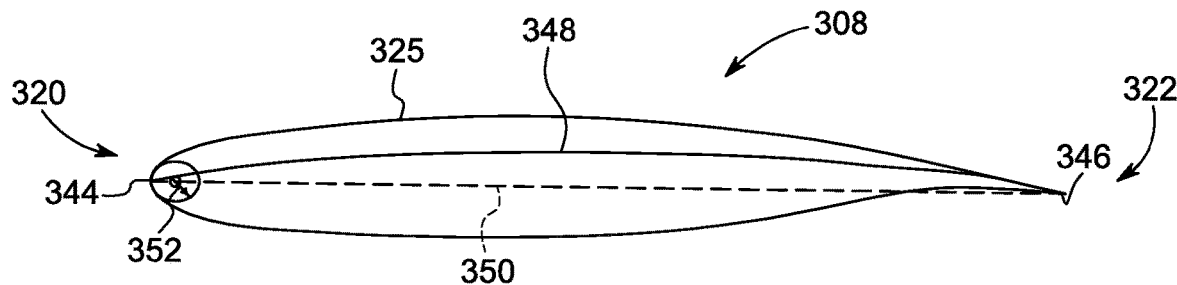
FIG. 8 illustrates a cross-sectional view of another embodiment of an inlet guide vane of an inlet guide vane assembly according to the present disclosure, particularly illustrating an upright inlet guide vane.
Figure 9:
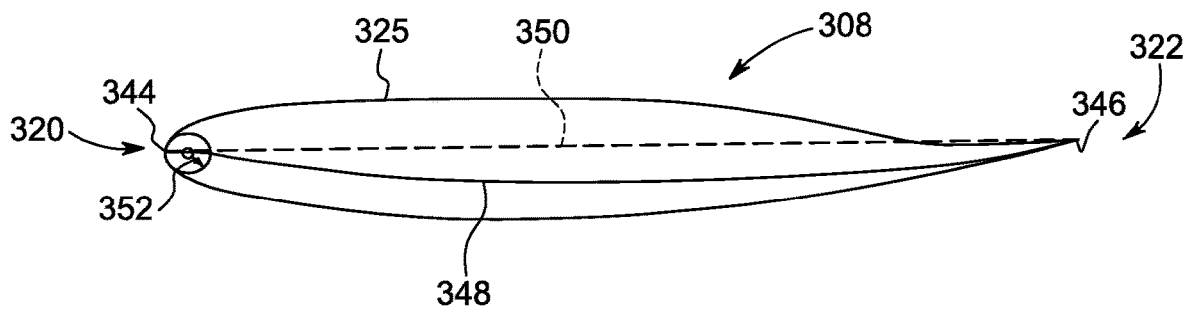
FIG. 9 illustrates a cross-sectional view of yet another embodiment of an inlet guide vane of an inlet guide vane assembly according to the present disclosure, particularly illustrating an inverted inlet guide vane.
Figure 10:
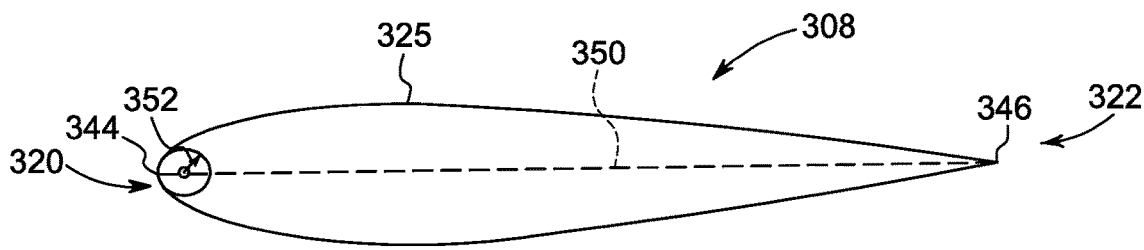
FIG. 10 illustrates a cross-sectional view of still another embodiment of an inlet guide vane of an inlet guide vane assembly according to the present disclosure, particularly illustrating a symmetrical inlet guide vane.
Figure 11:
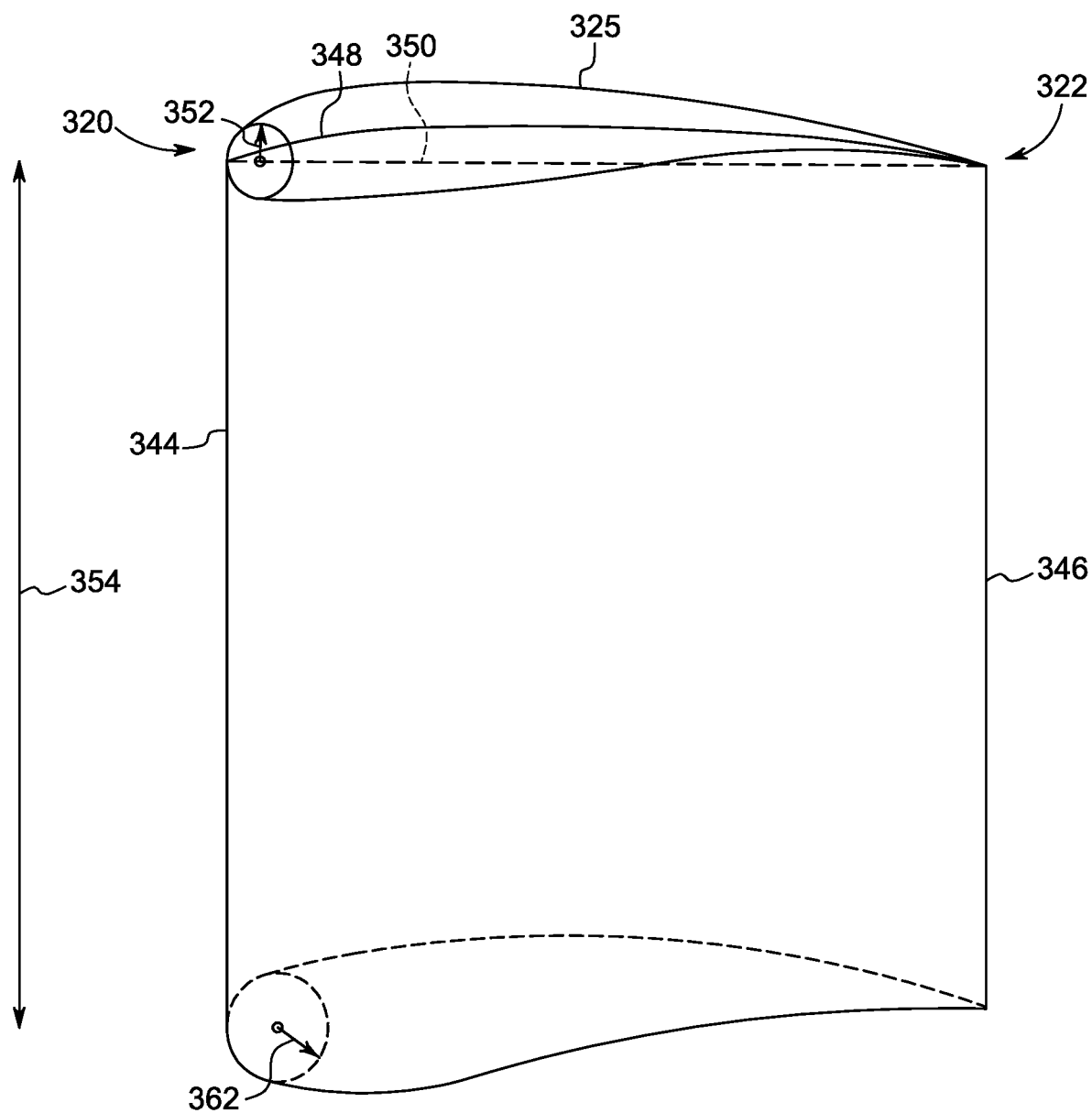
FIG. 11 illustrates a span-wise view of one embodiment of an inlet guide vane of an inlet guide vane assembly according to the present disclosure, particularly illustrating an inlet guide vane having a varying leading edge radius in the span-wise direction.

Referring now to FIGS. 8-10, cross-sectional views of additional embodiments of the inlet guide vanes 308 of the present disclosure are illustrated. It should be understood that such features can also be applied to struts. As shown, each of the inlet guide vanes 308 may have a unique shape and/or orientation corresponding to airflow conditions entering the BLI fan 300 at a particular location in the fan 300. Thus, any combination of shapes may be used in the inlet assembly 302 and can be chosen based on a determined swirl distortion of the airflow entering the BLI fan 300.

For example, as shown, each of the inlet guide vanes 308 may have a cambered upright airfoil cross-section (FIG. 8), a cambered inverted airfoil cross-section (FIG. 9), or a symmetrical airfoil cross-section (FIG. 10). More specifically, as shown in FIG. 8, the cambered upright inlet guide vane 308 generally has a mean camber line 348 above the chord line 350 of the airfoil, with the trailing edge 346 having a downward direction. Such cambered airfoils typically generate lift at zero angle of attack and since air follows the trailing edge 346, the air is deflected downward. As shown in FIG. 9, the inverted inlet guide 308 vane generally has a mean camber line 348 below the chord line 350 of the airfoil, with the trailing edge 346 having an upward direction. When a cambered airfoil is upside down, the angle of attack can be adjusted so that the lift force is upwards. In contrast, as shown in FIG. 10, the mean camber line 348 and the chord line 350 of a symmetrical airfoil are the same (i.e. the lines 348, 350 overlap and there is zero chamber).

It should be understood that the lift force depends on the shape of the airfoil, especially the amount of camber (i.e. curvature such that one surface is more convex than the other surface). In other words, increasing the camber of the airfoil turns the flow more which in turn generally increases lift. The local turning of the flow can be used to counter the local flow distortion and result in a more uniform flow profile ingested by the fan. Additionally, or alternatively, the flow turning may be used to generate a favorable swirl profile entering the fan radially, helping improve an efficiency and operability of the fan under distortion.

In addition, as shown generally in FIGS. 6-11, a leading edge radius 352 of one or more of the inlet guide vanes 308 may be designed to reduce swirl distortion of the airflow entering the BLI fan 300. In addition, as shown in FIG. 10, in certain embodiments, the leading edge radius 352 of one or more of the inlet guide vanes 308 may vary in a span-wise direction 354 (e.g. get larger or smaller) as a function of the airflow conditions entering the BLI fan 300. As such, the leading edge radius 352 of each inlet guide vane 308 can be designed according to the flow conditions it receives. In addition, as shown, a camber angle (i.e. a curve) for an individual vane 308 can also vary in the span-wise direction 354 to effectively turn the flow to a more uniform state at the discharge of the inlet guide vane 308.

It will be appreciated, however, that the vanes 308 depicted in FIGS. 6-11 are by way of example only, and are depicted schematically for exemplary purposes. In certain embodiments, the vanes 308 may each be thinner than depicted, particularly when incorporated into an engine of supersonic aircraft. Further, it will be appreciated that in other exemplary embodiments, the inlet assembly 302 may be incorporated into any other suitable engine for any other suitable aircraft. For example, in certain exemplary embodiments, the inlet assembly 302 may be incorporated into, or otherwise operable with, any other suitable gas turbine engine, such as a supersonic gas turbine engine for mounting in or to a supersonic aircraft. In certain exemplary embodiments, the engine may be mounted at an aft end of the aircraft (similar to engine 106 of aircraft 10), may be mounted on or to the wings, may be incorporated into the body of the aircraft (e.g., incorporated into the wings, fuselage, stabilizer, etc.), or may be operable with the aircraft in any other suitable manner.

Figure 12:
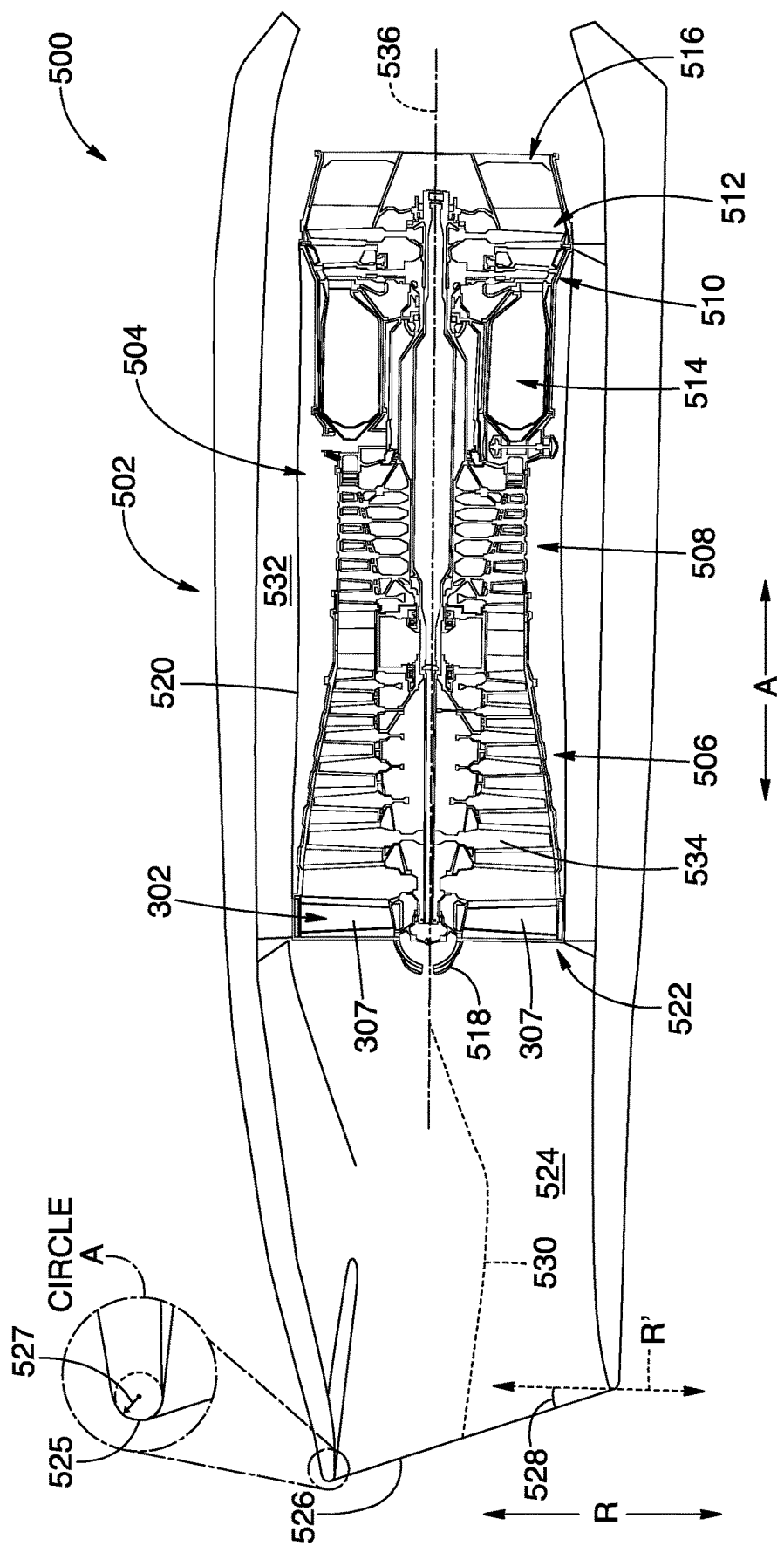
FIG. 12 illustrates a schematic, cross-sectional view of one embodiment of a supersonic gas turbine engine for mounting in or to a supersonic aircraft in accordance with an exemplary embodiment of the present disclosure.

More specifically, referring now to FIG. 12, an engine 500 in accordance with another exemplary aspect of the present disclosure is provided. As shown, the engine 500 generally includes an engine casing 502 and a gas turbine engine 504. For the embodiment shown, the engine casing 502 is configured as a nacelle surrounding at least in part the gas turbine engine 504. The gas turbine engine 504 generally includes a stage of compression airfoils and a turbine coupled to the stage of compression airfoils through an engine shaft for driving the stage of compression airfoils. More particularly, for the embodiment shown, the gas turbine engine 504 includes a compressor section having a compressor and a turbine section having the turbine, and the stage of compression airfoils is a stage of compressor rotor blades of the compressor of the compressor section of the gas turbine engine 504. However, in other embodiments, the stage of compression airfoils may instead be, e.g., a plurality of fan blades of a fan (see, e.g., fan blades 228 of FIG. 4).

Referring still to the gas turbine engine 504 of FIG. 12, the compressor is a first compressor 506, and the exemplary gas turbine engine 504 depicted further includes a second compressor 508. The first compressor 506 may be a low pressure compressor and the second compressor 508 may be a high pressure compressor. Moreover, the turbine section includes a first turbine 510 and a second turbine 512. The first turbine 510 may be a high pressure turbine coupled to the high pressure compressor/second compressor 508, and the second turbine 512 may be a low pressure turbine coupled to the low pressure compressor/first compressor 506. A combustion section 514 is located between the second compressor 508 and the first turbine 510. Further, the gas turbine engine 504 defines a nozzle 516 downstream of the turbine section.

As is also depicted, the gas turbine engine 504 includes a nose cone 518 and a gas turbine engine casing 520, with the gas turbine engine casing 520 surrounding the compressor section and the turbine section and defining an inlet 522. As also noted above, the engine 500 includes the engine casing 502, also referred to as the nacelle. The nacelle defines an airflow duct 524 upstream of the gas turbine engine inlet 522, and further defines a nacelle inlet 526 upstream of the airflow duct 524. More specifically, the casing 502 includes a forward lip 525 defining the nacelle inlet 526. As indicated in the close-up Callout Circle A of FIG. 12, the forward lip 525 defines a relatively small radius of curvature 527, such as a radius of curvature less than about two inches, such as less than about 1 inch, such as less than about 0.5 inches, such as less than about 0.25 inches. For the embodiment shown, the nacelle inlet 526 defines an angle 528 with the radial direction R (depicted relative to reference line R' in FIG. 12) greater than about fifteen degrees, such as greater than about twenty degrees, such as greater than about twenty-five degrees, such as greater than about thirty degrees, and up to about eighty-five degrees. Moreover, for the embodiment shown, the airflow duct 524, which extends between the gas turbine engine inlet 522 and the nacelle inlet 526, defines a centerline 530 (i.e., a reference line extending halfway between a top wall and a bottom wall in the plane depicted). For the embodiment shown, the centerline 530 is a non-linear centerline 530 (although in other embodiments, the centerline 520 may be a linear centerline). It will further be appreciated that the nacelle defines a bypass passage 532 around the gas turbine engine 504, which may be useful during certain phases of flight of a supersonic aircraft. The nonlinear centerline 530 of the airflow duct 524, may assist with facilitating an airflow into and through the bypass passage 532.

Figure 13:
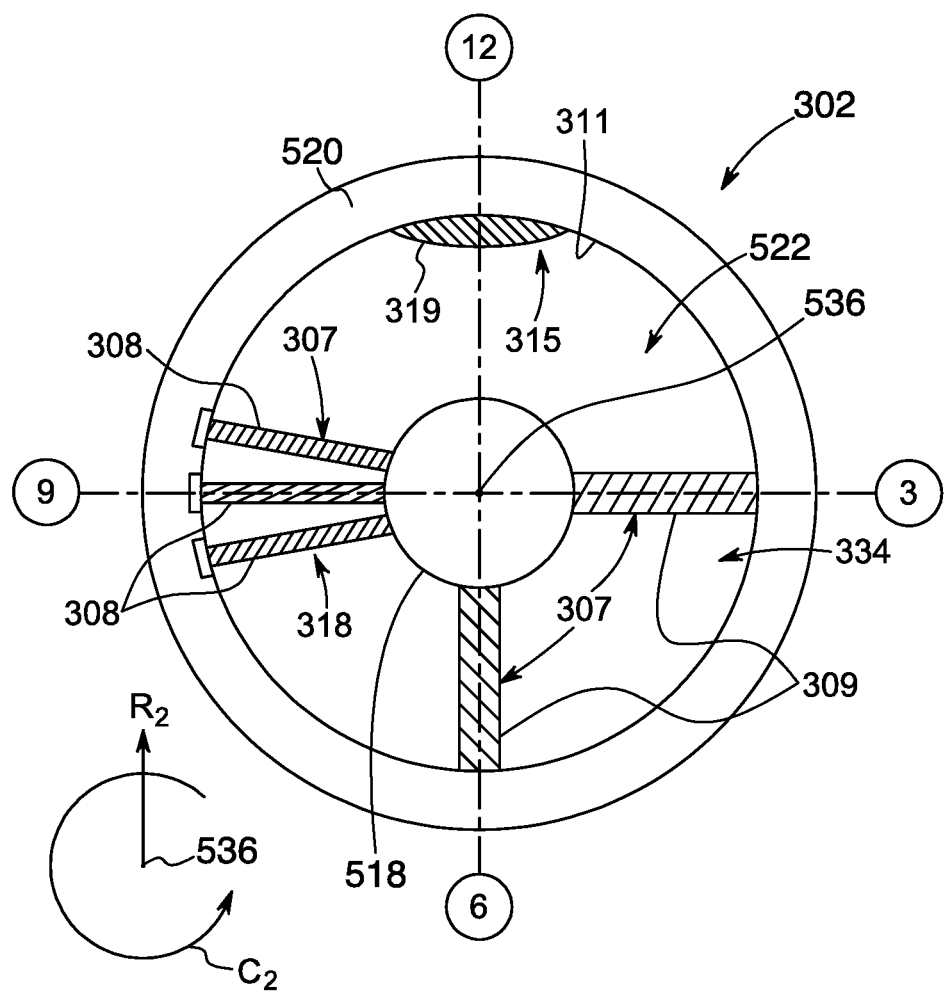
FIG. 13 illustrates a schematic, cross-sectional view of a gas turbine engine inlet of the exemplary engine of FIG. 12, along an axial centerline of the engine of FIG. 12.

However, such features, such as the sharp nacelle lip 525, may create an airflow distortion when the aircraft is subject to an angle of attack at an upstream-most stage of compression airfoils of the gas turbine engine 504, or more particularly, at a first stage of compressor rotor blades 534 of the first compressor 506 of the compressor section of the gas turbine engine 504. Accordingly, the exemplary engine 500 also includes a low distortion inlet assembly 302 mounted within the inlet 522. Referring now briefly also to FIG. 13, providing a close-up view of the exemplary low distortion inlet assembly 302, viewed along a central axis 536 of the engine 500, it will be appreciated that the exemplary low distortion inlet assembly 302 may be configured in a similar manner to the exemplary low distortion inlet assembly 302 described above with reference to FIGS. 5 through 10. The same numbers accordingly refer to the same parts.

As shown, it will be appreciated that the low distortion inlet assembly 302 may generally include one or more structural members 307 mounted at predetermined locations around the circumference of a central axis 536 of the engine 500 within the inlet 522 defined by the gas turbine engine casing 520 (e.g., extending between the gas turbine engine casing 520 and the nose cone 518). The predetermined locations define an airflow distortion exceeding a predetermined threshold. The low distortion inlet assembly 302 may also include at least one airflow modifying element 315 configured within the inlet 522 so as to reduce airflow distortion into the stage of compression airfoils (which, as noted above, is configured as a stage of compressor rotor blades 534).

As will be appreciated, the low distortion inlet assembly 302 may assist with accommodating, or correcting, a distortion in the airflow into the gas turbine engine 504 resulting from certain features of the supersonic engine 500. The inlet assembly 302 of FIGS. 12 and 13 may include one or more of the features described above with respect to the inlet assembly 302 incorporated into the aft-mounted engine. For example, the inlet assembly 302 of FIGS. 12 and 13 may include one or more of the structural members 307 and airflow modifying elements 315 described above with reference to FIGS. 5 through 10 (except incorporated into an inlet 522 of a gas turbine engine 504 of a supersonic engine 500).

Figure 14:
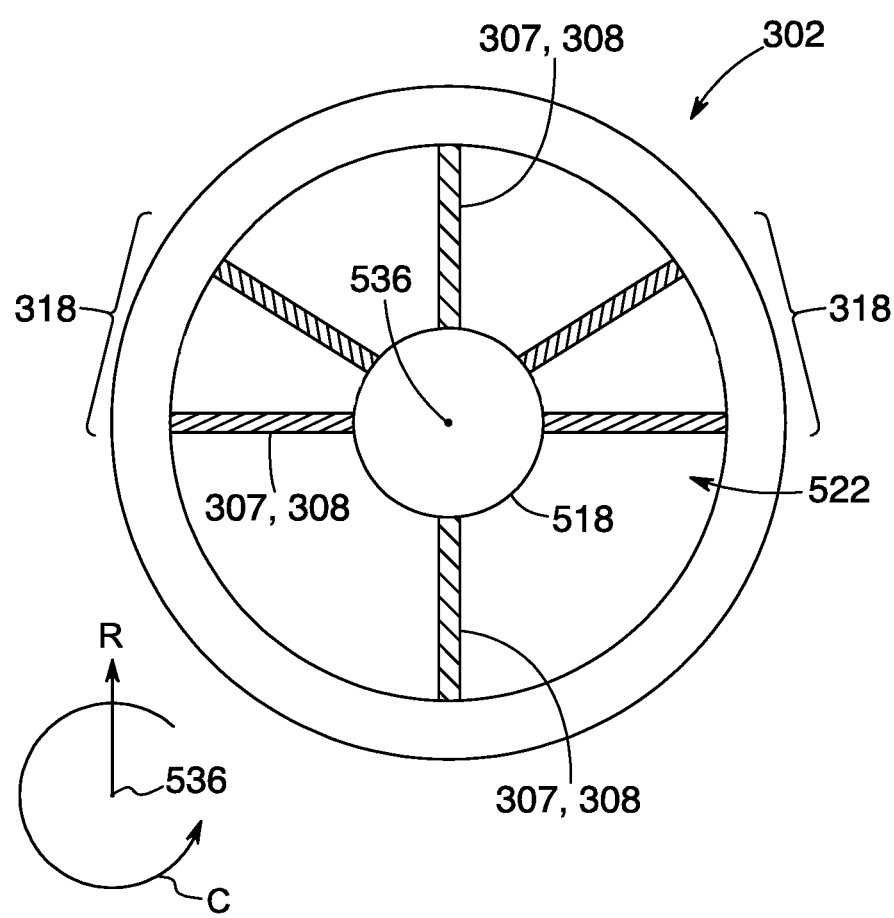
FIG. 14 illustrates a schematic, cross-sectional view of an inlet assembly as may be incorporated into an engine in accordance with the present disclosure.

By further way of example, referring to FIG. 14, a close-up view is provided of a low distortion inlet assembly 302 in accordance with an embodiment of the present disclosure, viewed along a central axis 536 of an engine 500. The inlet assembly 302 depicted may be configured in a similar manner as the exemplary inlet assembly 302 of FIG. 13. For example, the inlet assembly 302 includes a plurality of structural members 307 mounted at one or more predetermined locations around a circumferential direction C of the inlet assembly 302. As with the embodiments above, the placement of the structural members 307 may be set to address an airflow distortion through the inlet assembly 302 (e.g., through an inlet 526 of the engine casing 520/nacelle if the inlet assembly 302 is mounted within the airflow duct 524 of the casing 520, and/or through the inlet 522 of the gas turbine engine 504 if the inlet assembly 302 is mounted at the inlet 522 of the gas turbine engine 504).

More specifically, for the embodiment shown, the structural members 307 are asymmetrically spaced along the circumferential direction C, with a density of the structural members 307 being higher where a higher airflow distortion is expected. For example, in certain embodiments, the structural members may form one or more structural member groups 318, which may be spaced appropriately depending on a distortion pattern along the circumferential direction C. Additionally, or alternatively, a shape of the structural members 307 may be designed and chosen as a function of the pattern of distortion (see, e.g., FIGS. 6-11). For the embodiment shown the inlet assembly 302 includes two structural member groups 318 positioned substantially in a top half. More specifically, for the embodiment shown, the inlet assembly 302 defines a first circumferential portion having a first density of structural members 307 and a second circumferential portion having a second density of structural members 307, and the first density is different than the second density. However, in other embodiments, the inlet assembly 302 may include any other suitable number of groups 318, positioned at any suitable location circumferentially.

For the embodiment of FIG. 14, the structural members 307 are inlet guide vanes 308, but they may additionally or alternatively be configured as struts 309. It should be understood that the predetermined locations may be at the illustrated locations as well as any location therebetween and are meant to encompass locations having a high distortion and/or a location where a modification of the airflow would have the highest impact of correcting the distortion. Moreover, in certain embodiments, the inlet assembly 302 may be mounted at the inlet 522 to the gas turbine engine 504 (i.e., within the casing 520), or alternatively may be mounted within the engine casing 502 of the engine 500, e.g., within the inlet duct 524.

Figure 15:
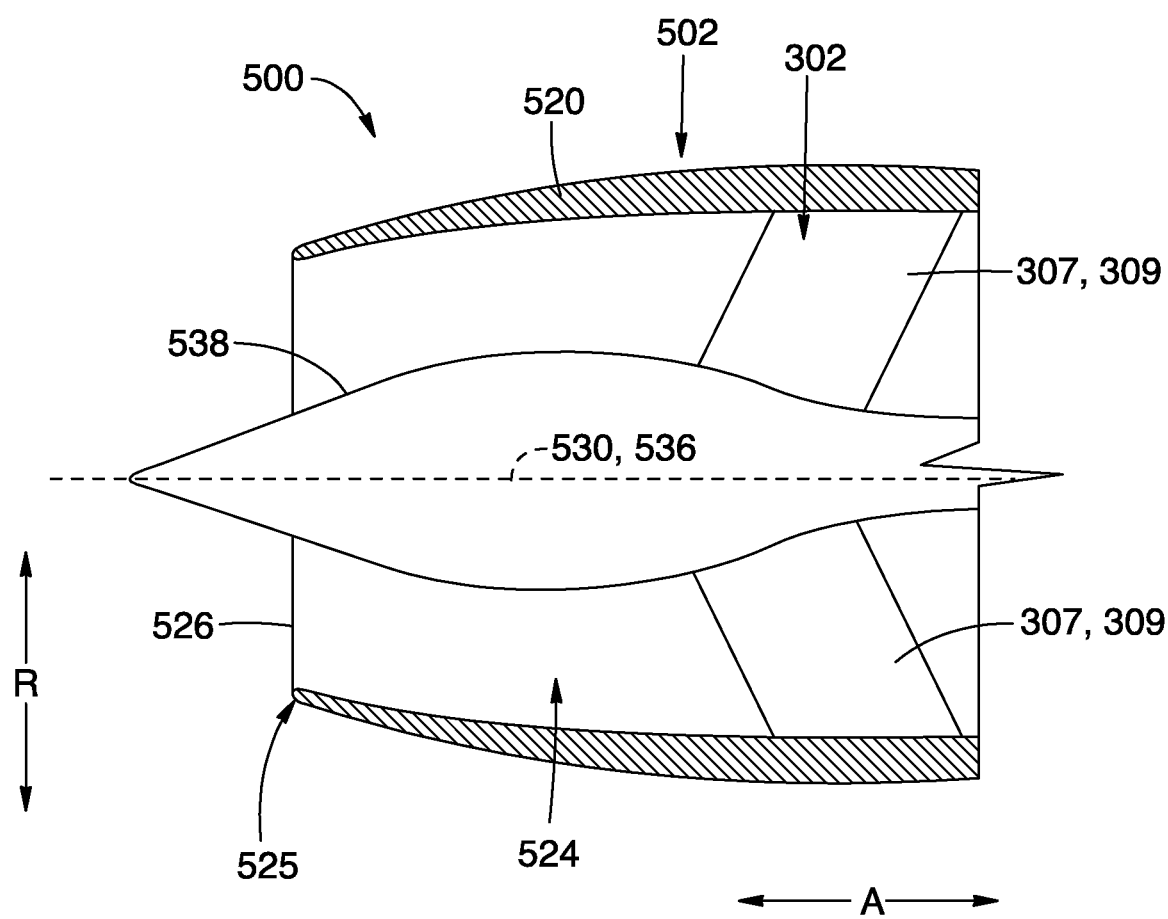
FIG. 15 shows a side view of a forward end of an engine in accordance with an exemplary embodiment of the present disclosure.

Further, it should be appreciated that the inlet assembly 302 and engine 500 discussed above are by way of example only. In other embodiments the airflow duct 524 of the casing 502 may have any other suitable shape (e.g., linear or nonlinear centerline, such as centerline 530, or may be a serpentine airflow duct 524). More specifically, FIG. 15 shows a forward end of an engine 500 having a casing 502 in accordance with another embodiment of the present disclosure. The engine 500 further includes a nosecone 538 having a more streamlined shape. Further the nosecone 538 depicted may extend forward of an inlet 526 defined by the casing 502 (as in the embodiment shown), but alternatively may not extend forward of the inlet 526. Further, for the embodiment shown in FIG. 15, the inlet assembly 302 is positioned within the airflow duct 524 of the casing 520, at a location upstream of the inlet 522 to the gas turbine engine 504 (not shown in FIG. 15) of the engine 500.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An engine for mounting in or to an aircraft, the engine defining a central axis and comprising:
   a stage of compression airfoils rotatable about the central axis;
   a casing surrounding the stage of compression airfoils and defining an inlet, wherein the inlet is positioned upstream of the stage of compression airfoils;
   a low-distortion inlet assembly mounted within the inlet, the low-distortion inlet assembly comprising
      one or more structural members mounted at predetermined locations around a circumference of the central axis within the inlet, the predetermined locations defining an airflow distortion exceeding a predetermined threshold; and
      at least one airflow modifying element configured within the inlet so as to reduce airflow distortion entering the stage of compression airfoils; and
   an engine casing surrounding the casing.

2. The engine of claim 1, wherein the engine is a turbofan or turbojet engine for mounting in or to a supersonic aircraft.

3. The engine of claim 2, further comprising:
   a gas turbine engine including the stage of compression airfoils and a turbine coupled to the stage of compression airfoils for driving the stage of compression airfoils, and wherein the casing is a gas turbine engine casing; and
   the engine casing configured as a nacelle.

4. The engine of claim 3, wherein the gas turbine engine comprises a nose cone, and wherein the inlet is defined with the nose cone.

5. The engine of claim 3, wherein the nacelle further defines a bypass passage around the gas turbine engine.

6. The engine of claim 3, wherein the inlet defined by the gas turbine engine casing is a gas turbine engine inlet, wherein the low-distortion inlet assembly is mounted within the gas turbine engine inlet.

7. The engine of claim 6, wherein the airflow duct of the nacelle defines a non-linear centerline.

8. The engine of claim 6, wherein the nacelle defines a nacelle inlet upstream of the airflow duct.

9. The engine of claim 6, wherein the engine further defines a radial direction, and wherein the nacelle inlet defines an angle with the radial direction greater than about 15 degrees.

10. The engine of claim 1, wherein the one or more structural members comprise at least one of an inlet guide vane or a strut.

11. The engine of claim 9, further comprising a plurality of inlet guide vanes placed in groups at the predetermined locations around the circumference of the central stage of compression airfoils.

12. The engine of claim 10, wherein each of the plurality of inlet guide vanes comprises a shape and an orientation configured to reduce airflow distortion entering the stage of compression airfoils.

13. The engine of claim 10, wherein the inlet assembly defines a first circumferential portion having a first density of structural members and a second circumferential portion having a second density of structural members, and wherein the first density is different than the second density.

14. The engine of claim 9, wherein a leading edge radius of one or more of the inlet guide vanes varies in a span-wise direction as a function of the airflow conditions entering the stage of compression airfoils.

15. The engine of claim 1, wherein the at least one airflow modifying element comprises at least one of a vortex generator, a contoured surface, a flap, or variable inlet guide vanes.

16. The engine of claim 14, wherein the at least one vortex generator or flap is mounted on one of the plurality of structural members.

17. The engine of claim 14, wherein the contoured surface is located on an inner surface of the casing.

18. The engine of claim 1, further comprising at least one of inlet guide vane trailing edge blowing, inlet guide vane trailing edge suction, or inlet guide vane angled flow injection configured to reduce flow distortion entering the stage of compression airfoils.

19. The engine of claim 1, wherein the predetermined locations are substantially evenly spaced with respect to the circumference of the central axis.

20. A low-distortion inlet assembly for an engine of an aircraft having a stage of compression airfoils rotatable about a central axis, the engine further defining an inlet located upstream of the stage of compression airfoils, the inlet assembly comprising:
   a plurality of structural members mounted at one or more predetermined locations around a circumference of the central axis of the engine within the inlet, the one or more predetermined locations comprising an airflow distortion exceeding a predetermined threshold;

at least one airflow modifying element configured within the inlet of the engine so as to reduce an airflow distortion entering the stage of compression airfoils; and an engine casing surrounding the engine.

\* \* \* \* \*